US009538174B2

United States Patent
Chiu et al.

(10) Patent No.: US 9,538,174 B2
(45) Date of Patent: Jan. 3, 2017

(54) METHOD AND APPARATUS FOR INVERSE SCAN OF TRANSFORM COEFFICIENTS IN HEVC

(71) Applicant: MEDIATEK INC., Hsin-Chu (TW)

(72) Inventors: Min-Hao Chiu, Hsinchu (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 282 days.

(21) Appl. No.: 13/781,770

(22) Filed: Mar. 1, 2013

(65) Prior Publication Data

US 2014/0044165 A1      Feb. 13, 2014

Related U.S. Application Data

(60) Provisional application No. 61/681,960, filed on Aug. 10, 2012.

(51) Int. Cl.
| | |
|---|---|
| H04N 19/109 | (2014.01) |
| H04N 7/26 | (2006.01) |
| H04N 19/129 | (2014.01) |
| H04N 19/176 | (2014.01) |
| H04N 19/44 | (2014.01) |
| H04N 19/423 | (2014.01) |

(52) U.S. Cl.
CPC ...... *H04N 19/00109* (2013.01); *H04N 19/129* (2014.11); *H04N 19/176* (2014.11); *H04N 19/423* (2014.11); *H04N 19/44* (2014.11)

(58) Field of Classification Search
CPC ............ H04N 7/00; H04N 1/415; H04N 7/30; H04N 7/26; G06K 9/36; G01H 11/00
See application file for complete search history.

(56) References Cited

U.S. PATENT DOCUMENTS

| | | | | |
|---|---|---|---|---|
| 5,452,104 | A * | 9/1995 | Lee | 358/426.14 |
| 7,587,093 | B2 * | 9/2009 | Lee | 382/250 |
| 7,984,651 | B2 * | 7/2011 | Randall et al. | 73/661 |
| 2012/0230420 | A1 * | 9/2012 | Sole Rojals et al. | 375/240.18 |

FOREIGN PATENT DOCUMENTS

| | | |
|---|---|---|
| CN | 1602633 A | 3/2005 |
| CN | 101616318 A | 12/2009 |

* cited by examiner

*Primary Examiner* — Sath V Perungavoor
*Assistant Examiner* — Patricia I Young
(74) *Attorney, Agent, or Firm* — Winston Hsu; Scott Margo (57) ABSTRACT

A method and apparatus for decoding two-level scanned transform coefficients corresponding to a transform unit (TU) are disclosed. The TU is divided into sub-blocks and the transform coefficients of the TU are scanned across the sub-blocks according to a first scan pattern, and each sub-block is scanned according to a second scan pattern. In one embodiment, the sub-blocks of the transform coefficients received from the variable length decoding are stored in an inverse scan buffer (or TC buffer) and the transform coefficients are retrieved from the inverse scan buffer row-by-row or column-by-column in a selected direction after a corresponding row or column of the transform coefficients is fully received. In a system incorporating an embodiment of the present invention, at least a leading row or a leading column of the transform coefficients is available in the selected direction before a last sub-block of the transform coefficients arrives.

20 Claims, 8 Drawing Sheets

METHOD AND APPARATUS FOR INVERSE SCAN OF TRANSFORM COEFFICIENTS IN HEVC

CROSS REFERENCE TO RELATED APPLICATIONS

The present invention claims priority to U.S. Provisional Patent Application, No. 61/681,960, filed on Aug. 10, 2012, entitled "HEVC cost efficient transform coefficient buffer in inverse scan". The U.S. Provisional Patent Application is hereby incorporated by reference in its entirety.

FIELD OF THE INVENTION

The present invention relates to video coding. In particular, the present invention relates to coding techniques for inverse scan of transform coefficients in a High Efficiency Video Coding (HEVC) system.

BACKGROUND AND RELATED ART

HEVC (High Efficiency Video Coding) is an advanced video coding system being developed under the Joint Collaborative Team on Video Coding (JCT-VC) Group of TU-T Study Group. In HEVC, the core of its coding layer is a coding tree block (CTB) or largest coding unit (LCU). The size of CTB or LCU can be 64×64, 32×32 or 16×16 for the Luma component. Each CTB or LCU can be divided into coding unit(s) (CU) using quad-tree partition. Each CU can be further split into one or more prediction units (PUs) for performing prediction. After the prediction process is performed on each CU, the prediction residues are coded using block-based transforms. A transform unit (TU) has its root at the CU level, where the TU size can be of 32×32, 16×16, 8×8, or 4×4. A TU can be divided into multiple 4×4 sub-blocks for TU size larger than 4×4. Quantization and entropy coding are applied to the TU to generate compressed data corresponding to the residues.

Figure 1:
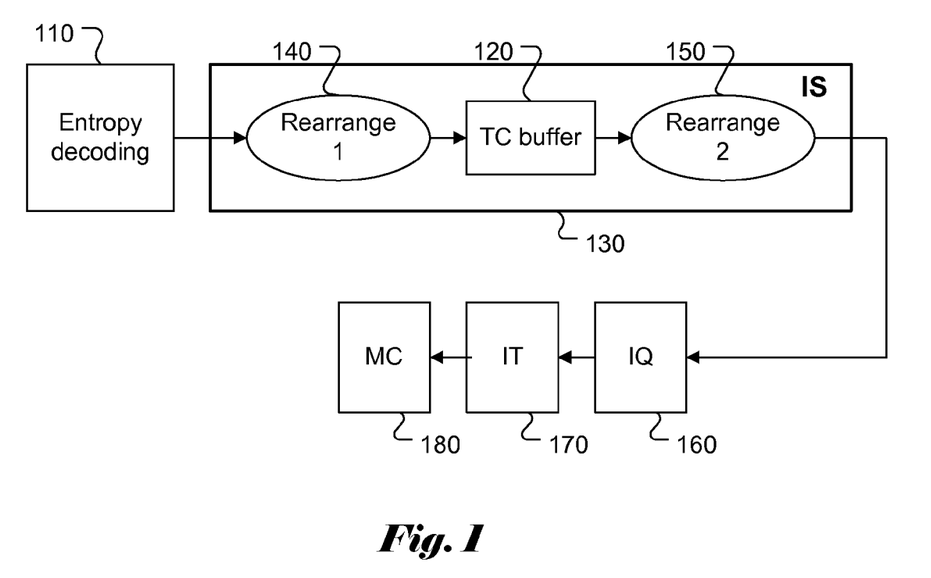
FIG. 1 illustrates an exemplary block diagram for decoding process of a coding unit, where two processing blocks for rearranging transform coefficient order and a transform coefficient buffer are used to perform inverse scan.

FIG. 1 illustrates an exemplary block diagram for decoding process of a CU. The compressed data is decoded by entropy decoder 110, such as a variable length decoder (VLD) to recover the coded transform coefficients. The quantized transform coefficients are stored in a transform coefficient buffer (TC buffer) 120 for performing inverse scan (IS) 130. IS can be implemented by "rearrange 1" 140, "rearrange 2" 150, or both. The inverse scan is required due to the processing order of the transform coefficients at the encoder side. After IS, transform coefficients are processed by inverse quantization (IQ) 160 and inverse transform (IT) 170 to generate the reconstructed residues. The reconstructed residues are then used by motion compensation (MC) 180 to generate a reconstructed CU. While FIG. 1 illustrates one exemplary configuration of decoding process, other system configuration may also be used. For example, instead of having IS between entropy decoding and IQ as shown in FIG. 1, IS can be located between IQ and IT.

In HEVC, the transform coefficients are scanned in a two-level fashion. Each TU is divided into sub-blocks. For the first level, the scanning is performed over the sub-blocks of a TU. For convenience, the first level scan is also referred to as level-1 scan or inter sub-block scan. The second scan is applied to transform coefficients within each sub-block. For convenience, the second level scan is also referred to as level-2 scan or intra sub-block scan. The scan orders (also called scanning patterns in this disclosure) in level 1 and level 2 depend on the TU size and the prediction mode.

Figure 2A:
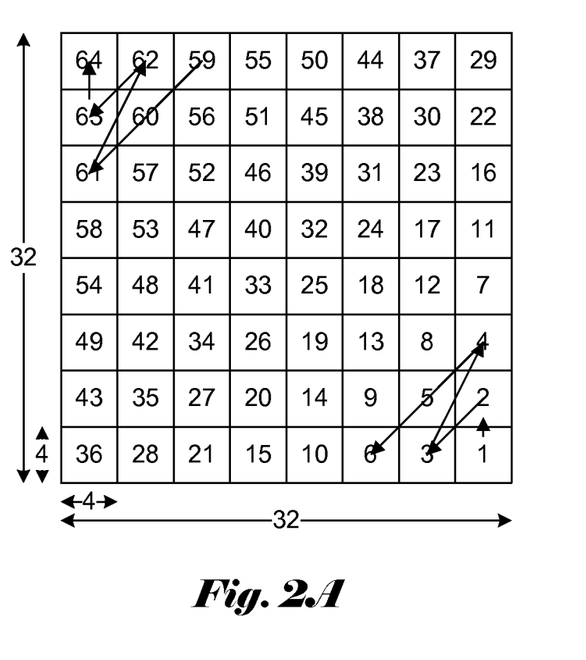
FIG. 2A illustrates the level-1 scan order for a 32×32 TU adopted in HEVC.
Figure 2B:
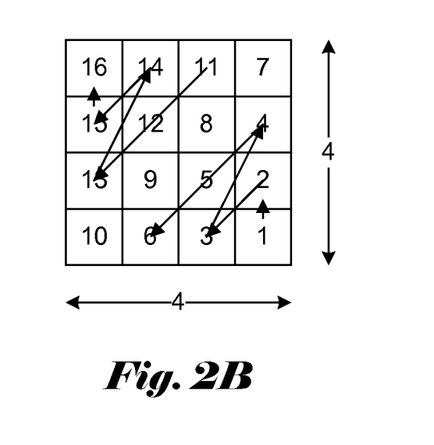
FIG. 2B illustrates the level-2 scan order for a 4×4 sub-block adopted in HEVC.

FIG. 2A and FIG. 2B illustrate exemplary scan orders adopted by HEVC for a 32×32 TU. The 32××32 TU is divided into 4×4 sub-blocks. The level-1 scan order (i.e., inter sub-block scan order) is shown in FIG. 2A and the level-2 scan order (i.e., intra sub-block scan order) is shown in FIG. 2B. As shown in FIG. 2A, the level-1 scan runs through the 64 sub-blocks in the 225-degree diagonal direction starting from the sub-block at the lower-right corner and ending at the sub-block at the upper-left corner (i.e., from rear to front of the TU, or sub-blocks 1→2→3→4→ . . . →64). During the level-1 scan, if the 4×4 sub-block contains at least one nonzero transform coefficient, further information for this 4×4 sub-block will be transmitted to convey the nonzero transform coefficient(s) in the level-2 scan as shown in FIG. 2B. The level-2 scan (i.e., the intra sub-block scan) runs through the 16 transform coefficients of the 4×4 sub-block in the 225-degree diagonal direction starting from the transform coefficient at the lower-right corner and ending at the transform coefficient at the upper-left corner (i.e., from rear to front of the sub-block, or transform coefficients 1→2→3→4→ . . . →16). On the other hand, during the level-1 scan, if the 4×4 sub-block does not contain any nonzero transform coefficient, no further information needs to be transmitted for the 4×4 sub-block. For a 16×16 TU, the level-1 scan order has the same scanning pattern as the 32×32 TU.

Figure 3:
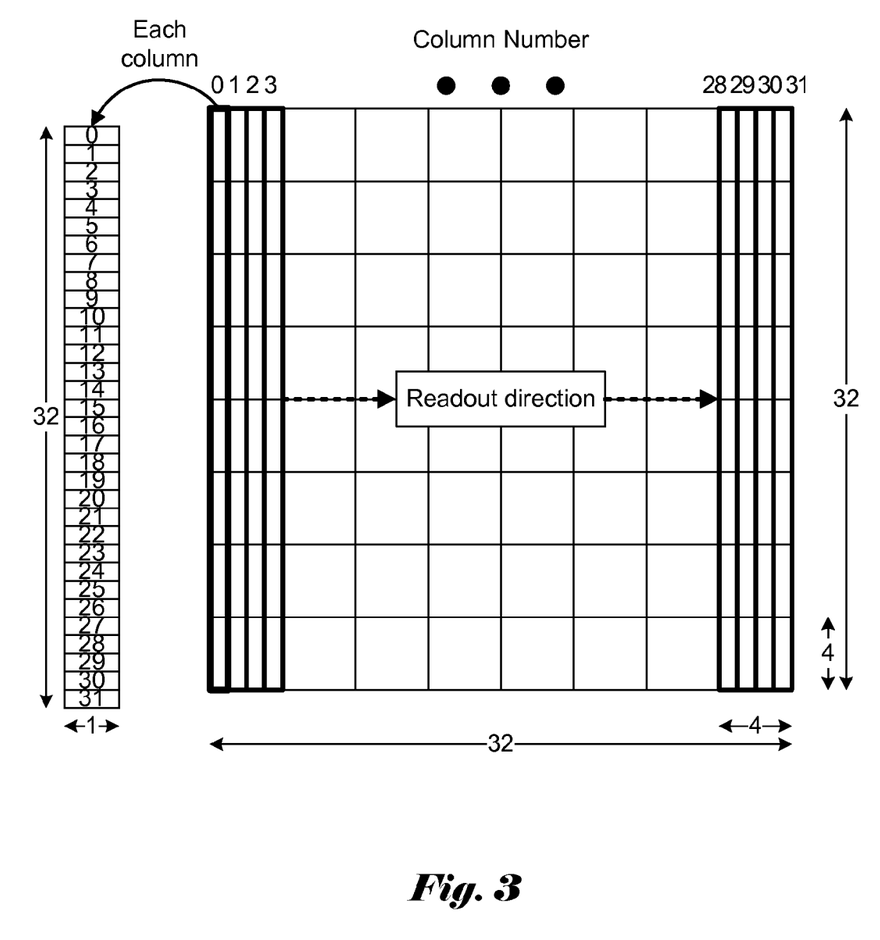
FIG. 3 illustrates the column by column scan order from IS to IQ/IT for a 32×32 TU in a reference HEVC decoder.

After two-level scanning is applied to transform coefficients of a TU, the scanned transform coefficients are coded by entropy coding, such as variable length coding. At the decoder side, entropy decoding such as variable length decoding (VLD) is used to recover the scanned transform coefficients. The scan order of the transform coefficients for the TU is the same as that shown in FIG. 2A and FIG. 2B. While the transform coefficients of a TU are scanned using two-level scanning, the IS output provided to the input to IQ/IT is according to a column by column order in a reference HEVC decoder. FIG. 3 illustrates the IS output order for a 32×32 TU, where the left-most column (i.e., column 0) is outputted first and right-most column (i.e., column 31) is outputted last. In other words, the transform coefficients from IS to IQ/IT are in the column scan order from front to rear, i.e., columns 0→1→ . . . →31. Within each column, the transform coefficients may be scanned from top to bottom. However, the scan order of the 32 transform coefficients from top to bottom within each column is not mandatory.

For the reference HEVC video decoder mentioned above, the last column (i.e., column 31) includes data for the first sub-block. Therefore, the processing of the first sub-block cannot start until the last column is received. Consequently, the TC buffer size will be equal to or larger than the biggest TU size for performing IS. For example, the biggest TU size in the HEVC main profile is 32×32. Therefore, the TC buffer size will have to be able to hold at least 64 sub-blocks of transform coefficients, i.e., 32×32× transform_coefficient_bitwidth (TC_bitwidth) bits. Furthermore, in order to achieve high system throughput, VLD to IS and IS to IQ/IT may have to be performed in parallel. The system may have to be configured in a ping-pong design and the TC buffer size will become twice as large. If the TC buffer is implemented using on-chip storage, such as DRAM or RAM, the TC buffer size will have direct impact on the chip cost. The cost associated with the TC buffer will become much higher if the largest TU size goes to 64×64 or even 128×128. It is desirable to develop an inverse scan method that can reduce the TC buffer requirement.

BRIEF SUMMARY OF THE INVENTION

A method and apparatus for decoding two-level scanned transform coefficients corresponding to an M×N block are disclosed. The M×N block is divided into sub-blocks of size L×L. The transform coefficients are scanned across the sub-blocks according to a first scan pattern, and each sub-block is scanned according to a second scan pattern, wherein M=L×M1, N=L×N1, and M, N, M1, N1, and L are positive integers. In one embodiment according to the present invention, the method comprises receiving the sub-blocks of the transform coefficients in the first scanning pattern; storing the sub-blocks of the transform coefficients in an inverse scan buffer (or TC buffer); retrieving the transform coefficients from the inverse scan buffer row-by-row or column-by-column in a selected direction after a corresponding row or column of the transform coefficients is fully received; and providing said correspond row or column of the transform coefficients for inverse quantization process and inverse transform process. The inverse scan buffer size for the M×N block is smaller than a total number of sub-blocks of the transform coefficients. Furthermore, at least a leading row or a leading column of the transform coefficients is available in the selected direction before the last sub-block of the transform coefficients arrives.

Retrieving the transform coefficients row-by-row or column-by-column in the selected direction is performed at a substantially short time period after the correspond row or column of the transform coefficients is fully received. The first scanning pattern is across the sub-blocks from lower right to upper left and the second scanning pattern is within the sub-block from lower right to upper left. The selected direction corresponds to right to left for column-by-column transform coefficient retrieval and the selected direction corresponds to bottom to top row-by-row transform coefficient retrieval.

One aspect of the present invention addresses the inverse scan buffer size. For example, the inverse scan buffer size corresponds to 29 sub-blocks or more if the transform coefficients are provided every four rows or every four columns in a row-by-row or column-by-column order in the selected direction, and wherein M and N correspond to 32 and L corresponds to 4. The inverse scan buffer corresponding to each sub-block of the transform coefficients can be reused by another sub-block of the transform coefficients and the sub-block of the transform coefficients is read out for the inverse quantization and inverse transform process.

Another aspect of the present invention addresses control of the inverse scan buffer. For example, the entropy coding needs to halt outputting sub-blocks of the transform coefficients when the inverse scan buffer is full. In another example, sub-block index registers can be used to manage the inverse scan buffer.

In another embodiment of the present invention, the inverse scan buffer is divided into a first set and a second set for ping-pong configuration, wherein one set is used for storing the sub-blocks of the transform coefficients received from the entropy decoding while the other set is used for retrieving the transform coefficients row-by-row or column-by-column in the selected direction after the corresponding row or column of the transform coefficients is fully received.

DETAILED DESCRIPTION OF THE INVENTION

As mentioned previously, a transform unit (TU) is processed with two-level scan in HEVC, where the first level scan is performed across the sub-blocks according to a first scanning pattern, and the second level scan is performed within a sub-block according to a second scanning pattern. For a 32×32 TU divided into 4×4 sub-blocks, the first level scan order runs across the sub-blocks from lower right to upper left and the second level scan order runs within the sub-block from lower right to upper left as shown in FIG. 2A and FIG. 2B respectively. However, in a reference decoder, the IS output to the subsequent stage of inverse quantization (IQ) and inverse transform (IT) is in a column by column order from front to rear (i.e., from left to right). Therefore, the first block will not be fully available until the last column is received.

Figure 4:
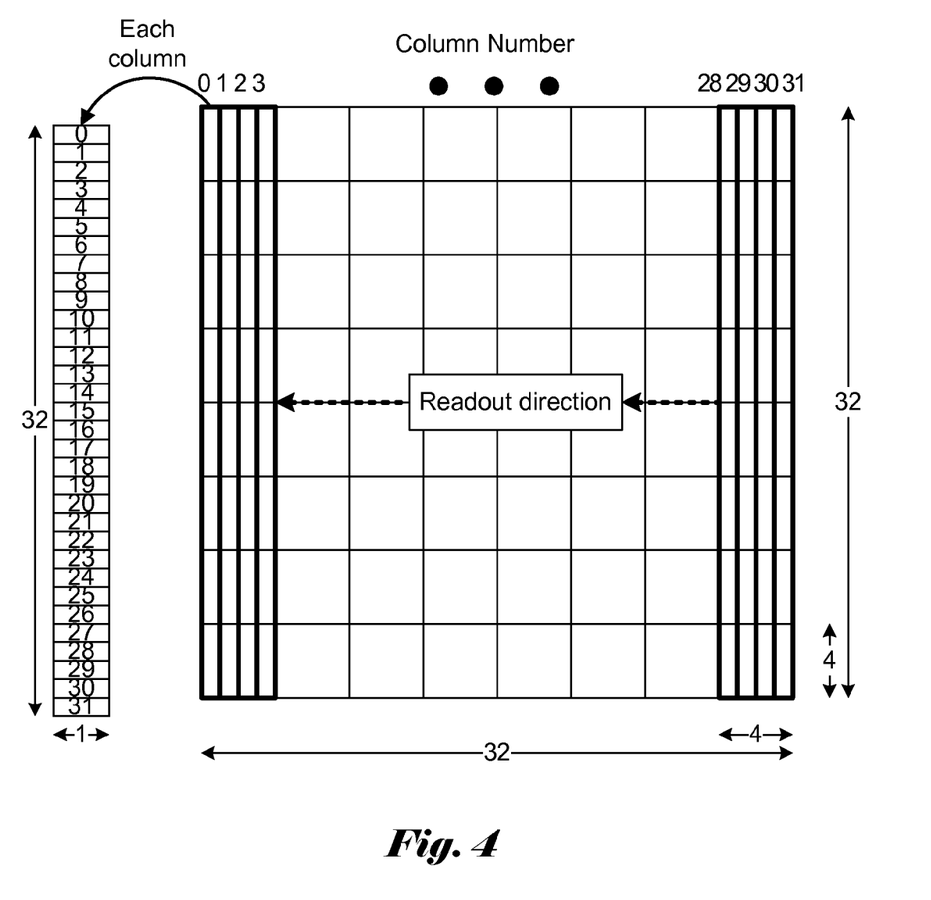
FIG. 4 illustrates an exemplary column by column scan order from IS to IQ/IT for a 32×32 TU in a system incorporating an embodiment of the present invention.

In an embodiment according to the present invention, the retrieving order from IS to IQ/IT is from rear column to front column, where the readout direction is from right to left (i.e., from column 31 to column 0) as shown in FIG. 4. Based on the readout direction of FIG. 4, as soon as column 31 is completely received in TC buffer, the column of transform coefficients is read out and IQ/IT is applied to the column. After the column is provided for the IQ/IT process, the TC buffer associated with this column (i.e., column 31 in this case) can be released. In other words, the memory space occupied by column 31 of transform coefficients can now be used by new data. Again, the scan order of 1×32 transform coefficients from top to bottom in each column is not mandatory. In order to reuse the released memory in the TC buffer, sub-block index registers (not shown in the drawing) can be used to maintain the sub-block index of the TU. When storing transform coefficients into the TC buffer, the sub-block indexes associated with the sub-blocks of the TU can be stored in the sub-block index registers. When reading out the transform coefficients from the TC buffer, the read address of the TC buffer can be based on the sub-block index stored in the sub-block index register. A person skilled in the art will be able to implement the sub-block index register in various forms such as look-up table, register file, direct calculation, etc.

Figure 5:
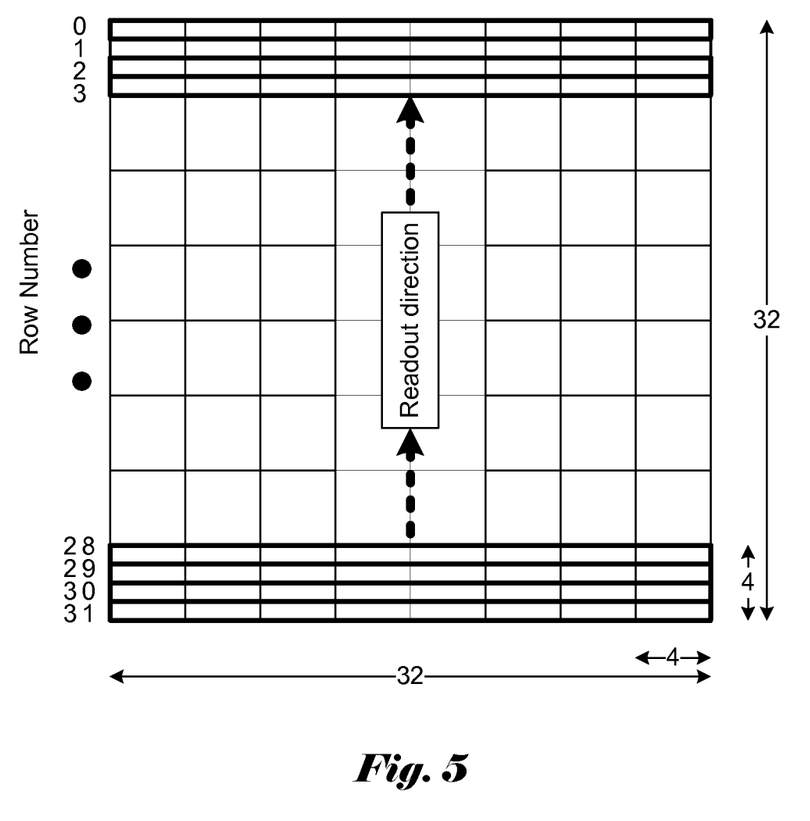
FIG. 5 illustrates an exemplary row by row scan order from IS to IQ/IT for a 32×32 TU in a system incorporating an embodiment of the present invention.

While a rear-to-front column-by-column scanning pattern is shown above to illustrate an embodiment of the present invention to reduce the TC buffer requirement, other scanning patterns may also be used to reduce the TC buffer requirement. For example, the retrieving order from IS to IQ/IT can be from bottom row to top row, as shown in FIG. 5. According to the readout direction of FIG. 5, as soon as row 31 is completely received in the TC buffer, the row of transform coefficients is read out and IQ/IT is applied to the row. After the row is provided for IQ/IT processing, the TC buffer associated with the row can be released for new data. In order to avoid buffer overflow of the TC buffer, the entropy decoding process needs to be halted when the TC buffer is full. The entropy decoding process will resume after some TC buffer space in the TC buffer is released.

Figure 6:
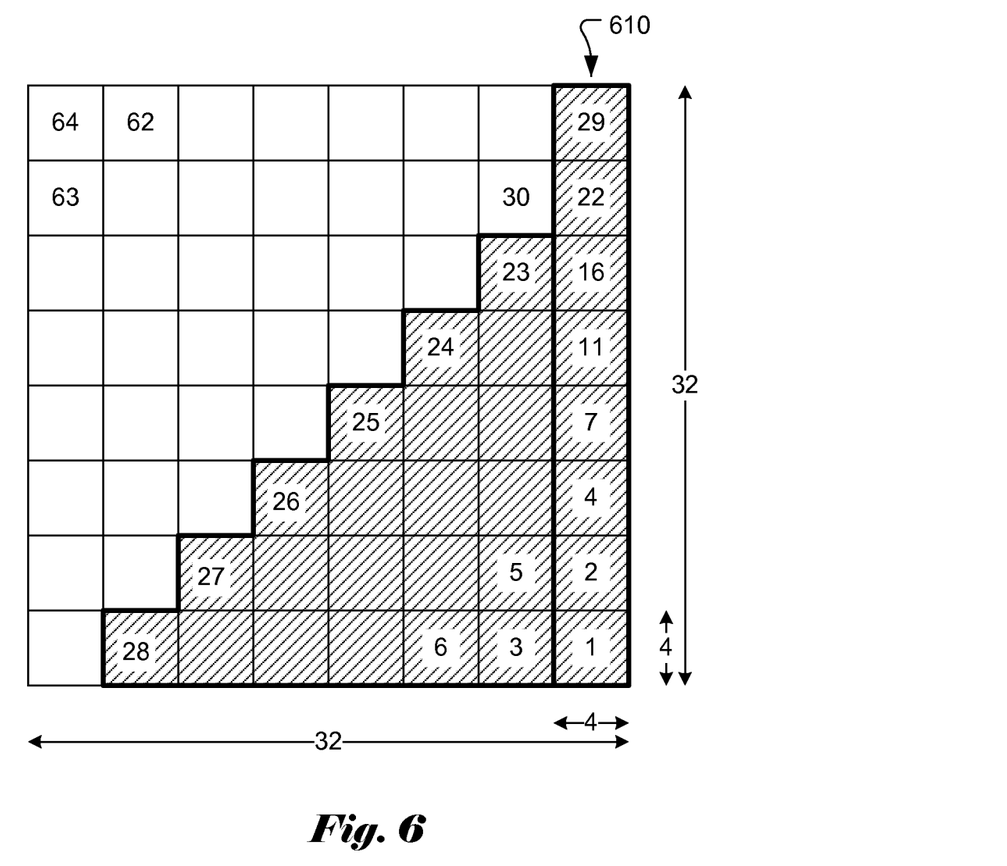
FIG. 6 illustrates the required TC buffer size for a system incorporating an embodiment of the present invention.

FIG. 6 illustrates an exemplary TC buffer requirement according to an embodiment of the present invention, where the shaded area (corresponding to 29 sub-blocks) indicates the memory space required for inverse scan. As soon as one column of sub-blocks 610 is ready in the TC buffer, columns associated with sub-block column 610 can be sent to the IQ/IT process one by one (i.e., from column 31 to column 28) within a short time period. The short time period may correspond to a time period from the time that the corresponding row(s) or column(s) of the transform coefficients is fully received to the time that the next sub-block arrives. For example, the short time period corresponds to the time from the sub-block column 610 is received (i.e., after sub-blocks 1, 2, 4, . . . , 22 and 29 are received) to the time that sub-block 30 arrives. Accordingly, a system incorporating an embodiment of the present invention can reduce memory size for the TC buffer from 64 sub-blocks of transform coefficients to 29 sub-blocks of transform coefficients (i.e., 29 sub-blocks×16 transform coefficients in each sub-block×TC_bitwidth) as shown in the shaded area of FIG. 6. The TC buffer reduction rate is about 54%.

Figure 7:
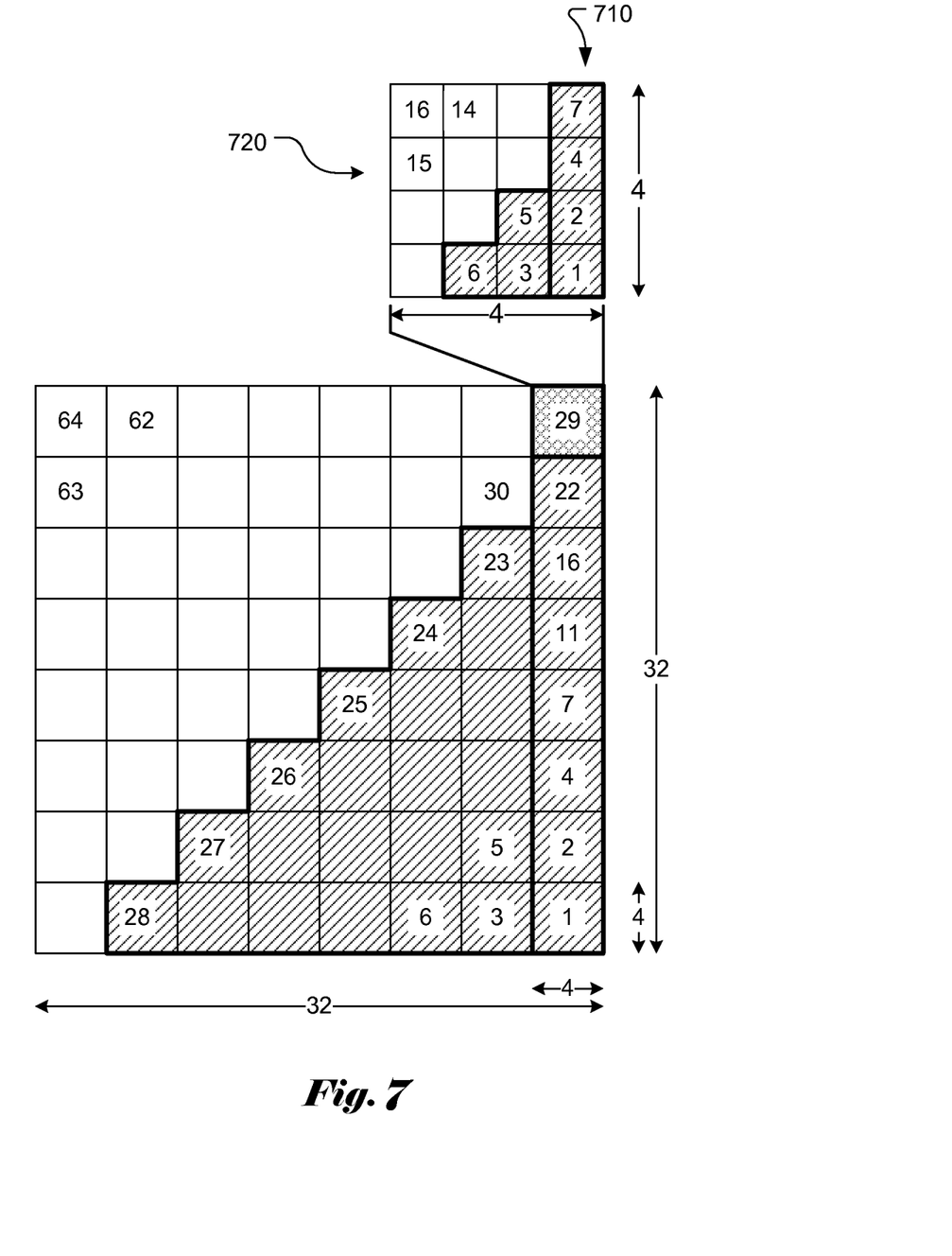
FIG. 7 illustrates the required TC buffer size for another system incorporating an embodiment of the present invention.

FIG. 7 illustrates another embodiment of the present invention to reduce the TC buffer requirement. FIG. 7 illustrates that further TC buffer reduction can be achieved from the system of FIG. 6. Block 720 corresponds to a zoomed-in view of sub-block 29. As soon as the first seven transform coefficients (i.e., transform coefficients 1, 2, . . . , 7) of sub-block 29 become available, the right-most column 710 of sub-block 29 becomes available. At this time, column 31 (as shown in FIG. 4) is ready in the TC buffer and the column of transform coefficients can be sent to the IQ/IT process without the need of waiting for complete sub-block 29 to arrive. Accordingly, the TC buffer size associated with sub-block 29 is reduced from 16 transform coefficients to 7 transform coefficients. The total TC buffer is further reduced to (28×16+7)×TC_bitwidth bits. The TC buffer reduction rate is about 55%.

Figure 8:
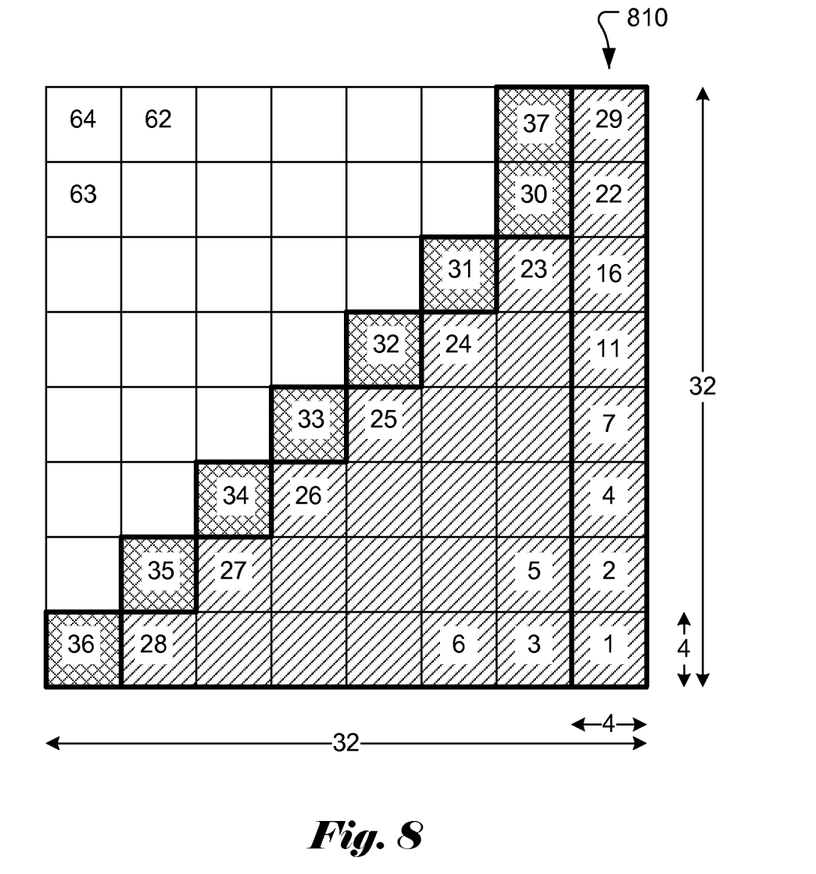
FIG. 8 illustrates the required TC buffer size for a system with ping-pong design incorporating an embodiment of the present invention.

In yet another embodiment of the present invention, a ping-pong design is used to increase system throughput for a high-performance decoder. As shown in FIG. 1, the entropy decoded data from entropy decoding 110 is written into the TC buffer 120 and the stored data is read out from the TC buffer 120 to feed IQ 160 and IT 170. For a high performance system, it is desirable to allow data written to the TC buffer and read out from the TC buffer concurrently. FIG. 8 illustrates the required TC buffer space in order to support ping-pong access of the TC buffer for a 32×32 TU. Compared to the system shown in FIG. 6, the additional memory space required for the ping-pong access is indicated by the shaded areas with crossed lines. As soon as a sub-block column of transform coefficients 810 is completely received in the TC buffer, columns associated with the sub-block column of transform coefficients is read out one by one and provided for the IQ/IT process. At the same time, entropy decoding can continue to decode the next eight sub-blocks of transform coefficients (i.e., sub-blocks 30 to 37) and store the decoded sub-blocks in the TC buffer. Therefore, for the high performance ping-pong design, the TC buffer incorporating an embodiment of the present invention can reduce memory size to 37 sub-blocks as shown in FIG. 8. On the other hand, the TC buffer size for a conventional system is double the 64 sub-blocks (i.e., 128 sub-blocks). Accordingly, the TC buffer reduction rate is about 71% for a high performance ping-pong design.

In FIG. 8, a transform coefficient buffer with 37 sub-blocks is used to illustrate an example of the ping-pong design. Compared to the system in FIG. 6 without the ping-pong design, 8 additional sub-blocks are used to support the ping-pong operation. Nevertheless, any number of additional sub-blocks can be used to practice the present invention. In other words, a system can use a transform buffer with more than 29 sub-blocks to provide ping-pong operation.

The above examples are illustrated for retrieving the transform coefficients from TC buffer to IQ/IT on a column by column basis. However, the present invention can also be applied to the case that the retrieving of transform coefficients from TC buffer to IQ/IT is performed on a row by row basis.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software code and other means of configuring code to perform the tasks in accordance with the invention will not depart from the spirit and scope of the invention.

The invention may be embodied in other specific forms without departing from its spirit or essential characteristics.

The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding two-level scanned transform coefficients corresponding to an M×N block, wherein the M×N block is divided into sub-blocks and each with an L×L block size, transform coefficients of the M×N block are scanned across sub-blocks of the M×N block according to a first scanning pattern, each sub-block is scanned according to a second scanning pattern, and wherein M=L×M1, N=L×N1, and M, N, M1, N1, and L are positive integers, the method comprising:

receiving the sub-blocks of the transform coefficients in the first scanning pattern, wherein the sub-blocks of the transform coefficients correspond to outputs from entropy decoding;

storing the sub-blocks of the transform coefficients in an inverse scan buffer;

retrieving the transform coefficients of the M×N block from the inverse scan buffer, wherein the M×N block comprises a plurality of rows of transform coefficients, or comprises a plurality of columns of transform coefficients;

wherein the inverse scan buffer outputs the rows of transform coefficients in a row-by-row manner, or outputs the columns of transform coefficients in a column-by-column manner; and wherein at least a leading row of transform coefficients of the M×N block is output from the inverse scan buffer after said leading row of transform coefficient of the M×N block is fully received by the inverse scan buffer and before a last sub-block of the transform coefficients of the M×N block arrives at the inverse scan buffer, where among the rows of transform coefficients, the leading row of transform coefficients is first output from the inverse scan buffer; or at least a leading column of transform coefficients of the M×N block is output from the inverse scan buffer after said leading column of transform coefficient is fully received by the inverse scan buffer and before the last sub-block of the transform coefficients arrives at the inverse scan buffer, where among the columns of transform coefficients, the leading column of transform coefficients is first output from the inverse scan buffer; and providing said corresponding row or column of the transform coefficients for inverse quantization and inverse transform process.

2. The method of claim 1, wherein the inverse scan buffer outputting the rows of transform coefficients in the row-by-row manner or outputting the columns of transform coefficients in the column-by-column manner is performed within a time period after a corresponding row or column of the transform coefficients is fully received, wherein the time period corresponds to a time period from a first time that the corresponding row or column of the transform coefficients is fully received to a second time that a next sub-block arrives.

3. The method of claim 1, wherein M and N have a same value corresponding to 64, 32 or 16 and L corresponds to 4.

4. The method of claim 1, wherein the first scanning pattern is across the sub-blocks from lower right to upper left, the second scanning pattern is within the sub-block from lower right to upper left, and the inverse scan buffer outputs transform coefficients in a selected direction from right to left for said retrieving the transform coefficients of the M×N block from the inverse scan buffer that is performed in the column-by-column manner and from bottom to top for said retrieving the transform coefficients of the M×N block from the inverse scan buffer that is performed in the row-by-row manner.

5. The method of claim 1, wherein an inverse scan buffer size corresponds to 29 sub-blocks or more if the row-by-row manner or the column-by-column manner corresponds to providing the transform coefficients every four rows or every four columns, and wherein M and N correspond to 32 and L corresponds to 4.

6. The method of claim 1, wherein an inverse scan buffer size corresponds to 28 sub-blocks and one partial sub-block, wherein the partial sub-block corresponds to seven transform coefficients, and wherein M and N correspond to 32 and L corresponds to 4.

7. The method of claim 1, wherein an inverse scan buffer size is smaller than a total number of sub-blocks of the transform coefficients, the inverse scan buffer is shared by the sub-blocks of the transform coefficients, and the inverse scan buffer corresponding to one sub-block of the transform coefficients is reused by another sub-block of the transform coefficients after said one sub-block of the transform coefficients is provided for the inverse quantization and inverse transform process.

8. The method of claim 7, wherein said receiving the sub-blocks of the transform coefficients is stopped when the inverse scan buffer is full.

9. The method of claim 7, wherein one or more sub-block index registers are used to manage the inverse scan buffer.

10. The method of claim 1, wherein the inverse scan buffer is divided into a first set and a second set for ping-pong configuration, wherein one set of the first set and the second set is used for said storing the sub-blocks of the transform coefficients received from the entropy decoding while other set of the first set and the second set is used for the inverse scan buffer outputting the rows of transform coefficients in the row-by-row manner or outputting the columns of transform coefficients in the column-by-column manner.

11. The method of claim 10, wherein the inverse scan buffer outputting the rows of transform coefficients in the row-by-row manner or outputting the columns of transform coefficients in the column-by-column manner is performed at a time period after a corresponding row or column of the transform coefficients is fully received.

12. The method of claim 10, wherein an inverse scan buffer size is greater than 29 sub-blocks if the row-by-row manner or the column-by-column manner corresponds to providing the transform coefficients every four rows or every four columns, and wherein M and N correspond to 32 and L corresponds to 4.

13. An apparatus for decoding two-level scanned transform coefficients corresponding to an M×N block, wherein the M×N block is divided into sub-blocks and each with an L×L block size, the transform coefficients are scanned across the sub-blocks according to a first scanning pattern, each sub-block is scanned according to a second scanning pattern, and wherein M=L×M1, N=L×N1, and M, N, M1, N1, and L are positive integers, the apparatus comprising:

means for receiving the sub-blocks of the transform coefficients in the first scanning pattern, wherein the sub-blocks of the transform coefficients correspond to outputs from entropy decoding;

means for storing the sub-blocks of the transform coefficients in an inverse scan buffer;

means for retrieving the transform coefficients of the M×N block from the inverse scan buffer,
wherein the M×N block comprises a plurality of rows of transform coefficients, or comprises a plurality of columns of transform coefficients;
wherein the inverse scan buffer outputs the rows of transform coefficients in a row-by-row manner, or outputs the columns of transform coefficients in a column-by-column manner; and
wherein at least a leading row of transform coefficients of the M×N block is output from the inverse scan buffer after said leading row of transform coefficient of the M×N block is fully received by the inverse scan buffer and before a last sub-block of the transform coefficients of the M×N block arrives at the inverse scan buffer, where among the rows of transform coefficients, the leading row of transform coefficients is first output from the inverse scan buffer; or at least a leading column of transform coefficients of the M×N block is output from the inverse scan buffer after said leading column of transform coefficient is fully received by the inverse scan buffer and before the last sub-block of the transform coefficients arrives at the inverse scan buffer, where among the columns of transform coefficients, the leading column of transform coefficients is first output from the inverse scan buffer; and
means for providing said corresponding row or column of the transform coefficients for inverse quantization and inverse transform process.

14. The apparatus of claim 13, wherein the inverse scan buffer outputting the rows of transform coefficients in the row-by-row manner or outputting the columns of transform coefficients in the column-by-column manner is performed within a time period after a corresponding row or column of the transform coefficients is fully received, wherein the time period corresponds to a time period from a first time that the corresponding row or column of the transform coefficients is fully received to a second time that a next sub-block arrives.

15. The apparatus of claim 13, wherein M and N have a same value corresponding to 64, 32 or 16 and L corresponds to 4.

16. The apparatus of claim 13, wherein the first scanning pattern is from lower right to upper left across the sub-blocks, the second scanning pattern is from lower right to upper left within the sub-block, and the inverse scan buffer outputs transform coefficients in a selected direction from right to left for said retrieving the transform coefficients of the M×N block from the inverse scan buffer that is performed in the column-by-column manner and corresponds to from bottom to top for said retrieving the transform coefficients of the M×N block from the inverse scan buffer that is performed in the row-by-row manner.

17. The apparatus of claim 13, wherein an inverse scan buffer size is smaller than a total number of sub-blocks of the transform coefficients, the inverse scan buffer is shared by the sub-blocks of the transform coefficients, and the inverse scan buffer corresponding to one sub-block of the transform coefficients is reused by another sub-block of the transform coefficients after said one sub-block of the transform coefficients is provided for the inverse quantization and inverse transform process.

18. The apparatus of claim 17, wherein said receiving the sub-blocks of the transform coefficients is stopped when the inverse scan buffer is full.

19. The apparatus of claim 17, wherein one or more sub-block index registers are used to manage the inverse scan buffer.

20. The apparatus of claim 13, wherein the inverse scan buffer is divided into a first set and a second set for ping-pong configuration, wherein one set of the first set and the second set is used for said storing the sub-blocks of the transform coefficients received from the entropy decoding while other set of the first set and the second set is used for the inverse scan buffer outputting the rows of transform coefficients in the row-by-row manner or outputting the columns of transform coefficients in the column-by-column manner.

* * * * *